United States Patent [19]

Li

[11] Patent Number: 5,751,501
[45] Date of Patent: May 12, 1998

[54] LENS MOUNTING STRUCTURE OF A SCANNER

[75] Inventor: Steve Li, Pa-Der, Taiwan

[73] Assignee: SPOT Technology, Inc., Hsinchu Hsien, Taiwan

[21] Appl. No.: 784,535

[22] Filed: Jan. 17, 1997

[51] Int. Cl.$^6$ .................................................. G02B 07/02
[52] U.S. Cl. ........................................................ 359/819
[58] Field of Search ................................... 359/819, 820, 359/811, 818, 830; 396/529

[56] References Cited

U.S. PATENT DOCUMENTS

| | | |
|---|---|---|
| 4,812,015 | 3/1989 | Iizuka et al. ............................. 359/819 |
| 4,929,073 | 5/1990 | La Plante et al. ....................... 359/819 |
| 5,396,487 | 3/1995 | Abe et al. ................................ 359/819 |
| 5,493,452 | 2/1996 | Hoshino et al. ......................... 359/819 |
| 5,608,579 | 3/1997 | Nomura .................................. 359/820 |

*Primary Examiner*—David C. Nelms
*Assistant Examiner*—Ricky Mack

[57] ABSTRACT

A lens mounting structure including a lens holder forming a part of a casing of a scanner, and a lens mounted in the lens holder, the lens holder having a receiving hole which receives the lens, two springy strips cut from the periphery of the receiving hole, and a plurality of longitudinal ribs raised from the springy strips and the periphery of the receiving hole and respectively pressed at the periphery of the lens to hold down the lens in the receiving hole, a glue filling hole through which a glue is filled into the receiving hole to fix the lens.

1 Claim, 3 Drawing Sheets

LENS MOUNTING STRUCTURE OF A SCANNER

BACKGROUND OF THE INVENTION

The present invention relates to scanners, and more specifically to a lens mounting structure of a scanner which holds the lens in place convenient for adjusting the focal length before it is fixed in place by a glue.

In the scanner assembly line, a cylindrical lens is mounted in a lens holder of a scanner by a first assembly station, then the focal length of the cylindrical lens is adjusted accurately by a second assembly station, and then the cylindrical lens is fixedly secured in place therin. FIG. 3 shows a lens mounting structure of a scanner according to the prior art. According to this lens mounting structure, the lens holder 1' comprises a cylindrical receiving hole 3', which holds a cylindrical lens 2', a radial screw hole 4' disposed in communication with the cylindrical receiving hole 3', and a tightening up screw 5' threaded into the screw hole 4' to hold down the cylindrical lens 2' when the focal length of the cylindrical lens 2' is set. This lens mounting method has drawbacks. One drawback is that the installation of the tightening up screw 5' takes much time. Another drawback is that the cylindrical lens 2' tend to be damaged when mounting the tightening up screw 5'. FIG. 4 shows another prior art lens mounting structure in which a radial glue filling hole 6' is formed in the periphery of the cylindrical receiving hole 3'. When the cylindrical lens 2' is mounted in the cylindrical receiving hole 3', a glue is filled into the cylindrical receiving hole 3' through the radial glue filling hole 6', and the focal length of the cylindrical lens 2' is adjusted before the glue is hardened. Because the outer diameter of the cylindrical lens 2' is smaller than the inner diameter of the cylindrical receiving hole 3', the cylindrical lens 2' tends to displace or fall out of the lens holder 1' when the assembly is shifted from one assembly station to the next before the glue is hardened. FIG. 5 shows another prior art lens mounting structure in which two longitudinal ribs 311' are raised from the periphery of the cylindrical receiving hole 3' for holding down the cylindrical lens 2' in the cylindrical receiving hole 3'. However, this structure still cannot firmly retain the cylindrical lens 2' in position before the filled glue has been hardened.

SUMMARY OF THE INVENTION

The present invention has been accomplished to provide a lens mounting structure which eliminates the aforesaid drawbacks. It is the main object of the present invention to provide a lens mounting structure which can firmly retain the lens in place before the adjustment of its focal length. According to the present invention, the lens holder comprises a receiving hole which receives the lens, two springy strips cut from the periphery of the receiving hole, and a plurality of longitudinal ribs raised from the springy strips and the periphery of the receiving hole and respectively pressed at the periphery of the lens to hold down the lens in the receiving hole, and a glue filling hole through which a glue is filled into the receiving hole to fix the lens, after the focal length has been accurately adjusted.

DETAILED DESCRIPTION OF THE PREFERRED EMBODIMENT

Figure 1:
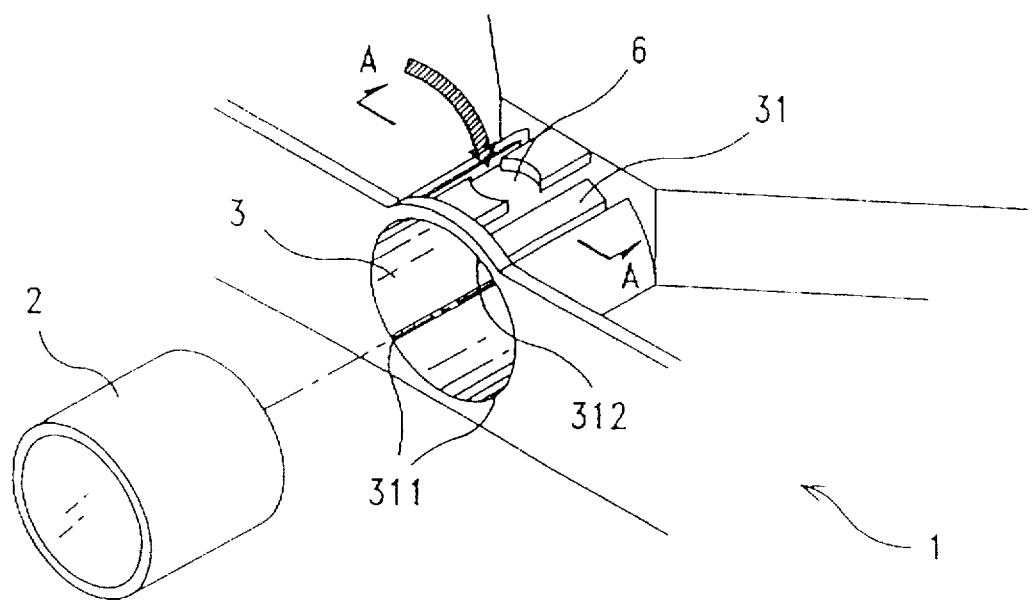
FIG. 1 is an exploded view of a lens mounting structure according to the present invention.
Figure 2:
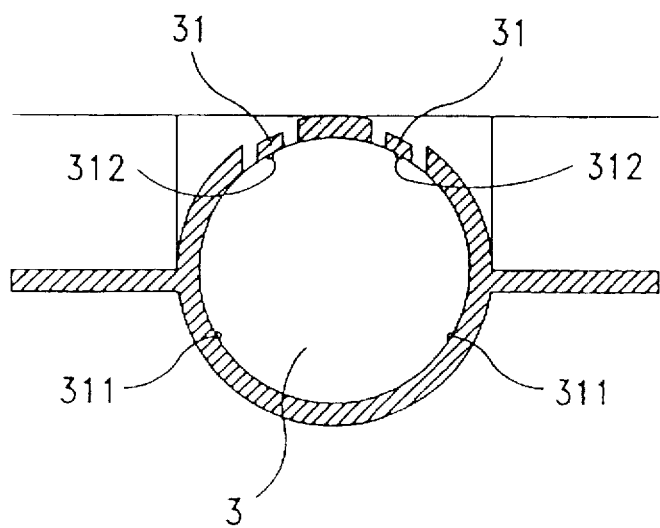
FIG. 2 is a sectional view taken along line A—A of FIG. 1.
Figure 3:
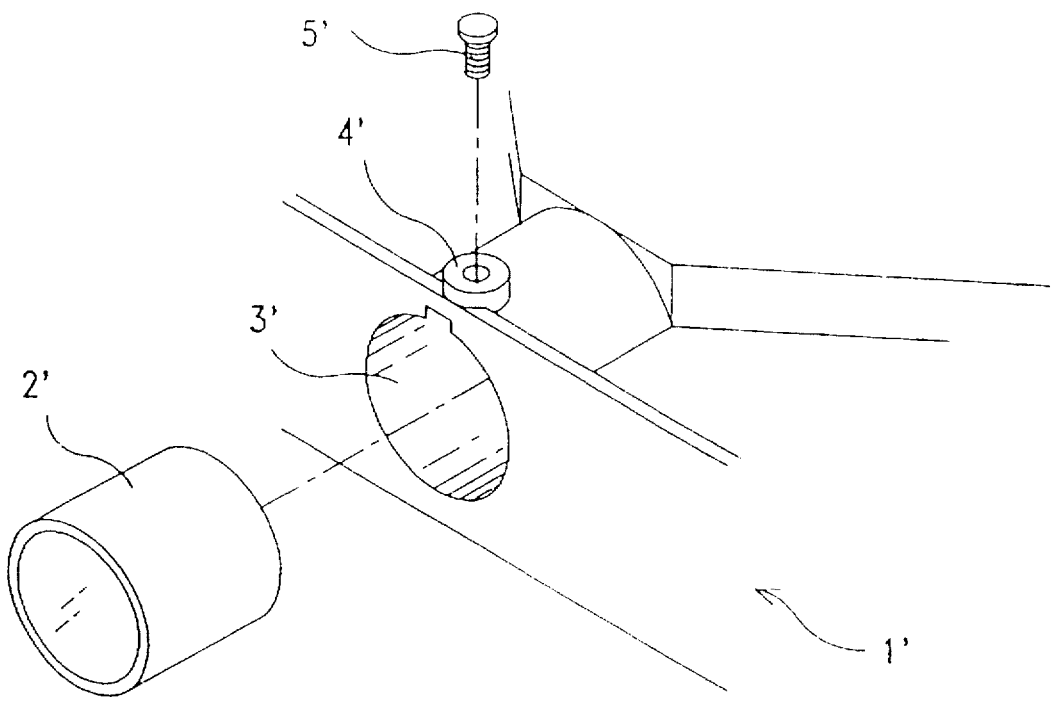
FIG. 3 is an exploded view of a lens mounting structure according to the prior art.
Figure 4:
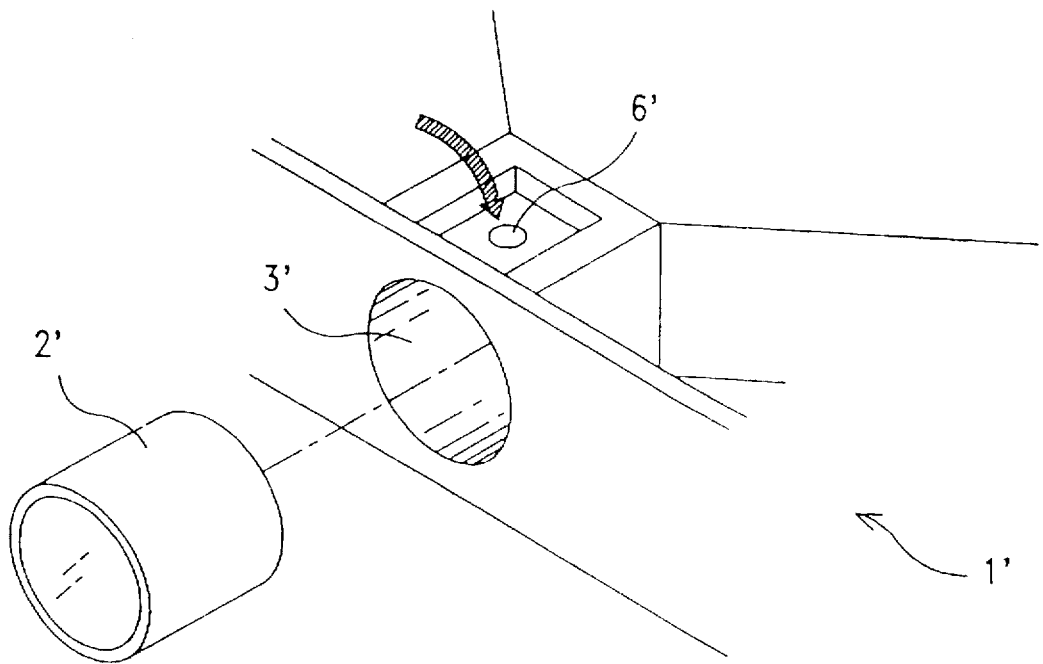
FIG. 4 is an exploded view of another lens mounting structure according to the prior art.
Figure 5:
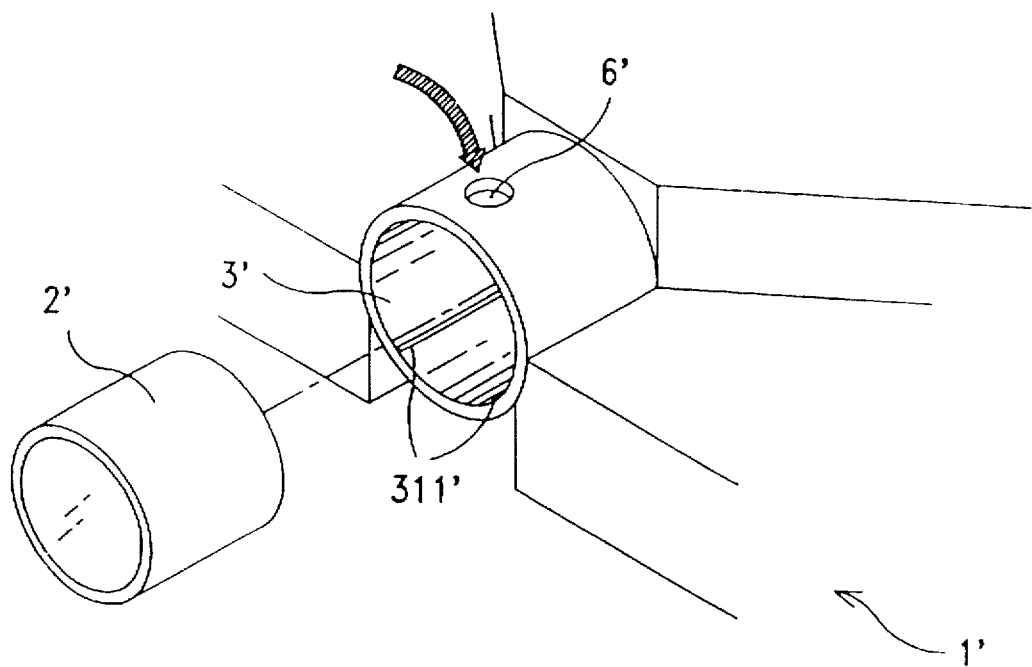
FIG. 5 is an exploded view of still another lens mounting structure according to the prior art.

Referring to FIGS. 1 and 2, a lens mounting structure in accordance with the present invention is generally comprised of a cylindrical lens 2, and a lens holder 1. The lens holder 1 is a part of a casing of a scanning mechanism of a scanner, comprising a cylindrical receiving hole 3 adapted for receiving the cylindrical lens 2, a glue filling hole 6 through the periphery of the cylindrical receiving hole 3 in the middle, two integral longitudinal springy strips 31 cut from the periphery of the cylindrical receiving hole 3 and disposed at two opposite sides of the glue filling hole 6, two first longitudinal ribs 312 respectively raised from the longitudinal springy strips 31 at an inner side along the length, and two second longitudinal ribs 311 raised from the periphery of the cylindrical receiving hole 3 at an inner side symmetrical to the first longitudinal ribs 312. The diameter of the cylindrical lens 2 fits the cylindrical receiving hole 3 of the lens holder 1. When the cylindrical lens 2 is inserted into the cylindrical receiving hole 3, it is immediately retained in place by the first longitudinal ribs 312 and the second longitudinal ribs 311. When the cylindrical lens 2 is set into position and its focal length is accurately adjusted, a glue is filled through the glue filling hole 6 into the cylindrical receiving hole 3 to fill up the gap within the periphery of the cylindrical receiving hole 3 around the periphery of the cylindrical lens 2. When the glue is hardened, the cylindrical lens 2 is fixedly secured in place.

While only one embodiment of the present invention has been shown and described, it will be understood that various modifications and changes could be made thereunto without departing from the spirit and scope of the invention disclosed.

What the invention claimed is:

1. A lens mounting structure comprising a cylindrical lens, and a lens holder formed in a part of a casing of a scanning mechanism of a scanner to hold said cylindrical lens, wherein said lens holder comprises a cylindrical receiving hole, which receives said cylindrical lens, two integral longitudinal springy strips cut from the periphery of said cylindrical receiving hole and disposed at two opposite sides of said glue filling hole, two first longitudinal ribs respectively raised from said longitudinal springy strips at an inner side along the length thereof and pressed against the periphery of said cylindrical lens, and two second longitudinal ribs respectively raised from the periphery of said cylindrical receiving hole at an inner side symmetrical to said first longitudinal ribs and pressed against the periphery of said cylindrical lens, and a glue filling hole through the periphery of said cylindrical receiving hole in a middle through which a glue is filled into said cylindrical hole to fix said cylindrical lens in place, after the focal length has been accurately adjusted.

* * * * *